Patented Jan. 31, 1928.

1,657,869

UNITED STATES PATENT OFFICE.

JULIUS E. SEITZ, OF PENNS GROVE, NEW JERSEY, ASSIGNOR TO E. I. DU PONT DE NEMOURS & COMPANY, OF WILMINGTON, DELAWARE, A CORPORATION OF DELAWARE.

PROCESS OF PRODUCING INDIGO WHITE.

No Drawing. Application filed March 25, 1924, Serial No. 701,626. Renewed August 19, 1927.

This invention relates to the production of leuco-indigo, and comprises first subjecting the indigo in a caustic alkali suspension to the reducing action of finely divided iron, and then near the end of the reaction supplementing the action of the iron by adding to the reaction mass a small amount of a relatively strong reducing agent for the purpose of reducing such indigo as may have remained unaffected by the iron, to the leuco-condition.

In the production of indigo white by the reduction of indigo by means of iron, the indigo is added to a mixture of aqueous caustic and very finely divided iron. When the mixture is warmed, the indigo is reduced almost entirely to indigo white. It is then necessary to remove the solution of indigo white from the iron sludge, but this under ordinary conditions is extremely difficult. The sludge settles very slowly, and it is almost impossible to filter the solution from the sludge. As a result of this condition there is always some loss of indigo in the sludge, such loss frequently amounting to from 2 to 4%.

I have now discovered that if, after completion of the reduction of iron as above described, a small amount of a strong, water soluble reducing agent, such for example as sodium hydrosulfite or sodium sulfide, is added, these difficulties are largely overcome. The iron sludge settles quickly and filtration of the liquor from the sludge takes place rapidly. It is, therefore, possible to decant the greater part of the indigo white solution from the iron sludge and then to filter off the sludge from the remaining liquor and to wash it free from reduced indigo. Using this improved process, the yield of indigo white is practically quantitative.

The following will serve as an example of the improved process. 210 parts of water, 36 parts of caustic soda and 26 parts of pyrophoric iron are charged into a container which is equipped with good agitation and so arranged that a continuous stream of hydrogen can be passed through. 81 parts of powdered indigo are then added slowly, raising the temperature gradually to about 60–70° C. When the indigo has all been added, the mixture is stirred for 15–30 minutes at 60–70° C. and 5 parts of sodium hydrosulfite are then added. The charge is stirred 15 minutes longer, after which the iron sludge is allowed to settle and the supernatant liquor is decanted off. The remainder of the charge is then filtered and washed.

In place of hydrogen in the above example, I may use some other inert gas such as producer gas, which will insure the exclusion of oxygen.

I claim:

1. The process of reducing indigo to leuco-indigo, which comprises subjecting indigo in suspension in an aqueous caustic alkali solution to the action of finely divided iron until the indigo is almost entirely reduced, and then adding to the reaction mass a stronger reducing agent than iron.

2. A process as set forth in claim 1 in which the stronger reducing agent is a hydrosulfite.

3. In the process of reducing indigo to leuco-indigo by means of finely divided iron, the step which comprises adding to the reaction mass near the end of the reaction a stronger reducing agent than iron.

4. A process as set forth in claim 3 in which the stronger reducing agent is a hydrosulfite.

5. A process as set forth in claim 3 in which the stronger reducing agent is sodium hydrosulfite.

6. A process as set forth in claim 3 in which the stronger reducing agent is an inorganic compound comprising sodium and sulfur.

7. Processes of the kind set forth in claim 1 inclusive in which the temperature of the reaction mixture during the reduction is kept at from about 60 to 70° C.

8. A process of the kind set forth in claim 1 in which the stronger reducing agent is a hydrosulfite, and the temperature of the reaction mixture during the reduction is kept at from about 60 to 70° C.

9. A process of the kind set forth in claim 3 in which the temperature of the reaction mixture during the reduction is kept at from about 60 to 70° C.

10. A process of the kind set forth in claim 3 in which the stronger reducing agent is a hydrosulfite, and the temperature of the reaction mixture during the reduction is kept at from about 60 to 70° C.

In testimony whereof I affix my signature.

JULIUS E. SEITZ.